United States Patent
Merino Lopez

(10) Patent No.: US 7,380,577 B2
(45) Date of Patent: Jun. 3, 2008

(54) TREAD PATTERN HAVING AT LEAST ONE INSERTED ELEMENT

(75) Inventor: José Merino Lopez, Riom (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 56 days.

(21) Appl. No.: 11/302,879

(22) Filed: Dec. 14, 2005

(65) Prior Publication Data

US 2006/0090829 A1    May 4, 2006

Related U.S. Application Data

(63) Continuation of application No. PCT/EP2004/006333, filed on Jun. 11, 2004.

(30) Foreign Application Priority Data

Jun. 16, 2003    (FR) .................................. 03 07233

(51) Int. Cl.
  *B60C 11/117*    (2006.01)
  *B60C 11/13*    (2006.01)
(52) U.S. Cl. ........................ 152/209.15; 152/209.17; 152/209.22
(58) Field of Classification Search ............ 152/209.15, 152/209.17, 209.19, 209.22, 901
  See application file for complete search history.

(56) References Cited

U.S. PATENT DOCUMENTS 3,727,661 A * 4/1973 Hoke ..................... 152/209.22
2006/0090826 A1 * 5/2006 Merino Lopez ........ 152/209.17
2006/0090827 A1 * 5/2006 Merino Lopez ........ 152/209.17

FOREIGN PATENT DOCUMENTS

| GB | 903389 |   | 8/1962 |
| JP | 02-179506 | * | 7/1990 |
| JP | 11-059135 | * | 3/1999 |
| JP | 2001-030715 A |   | 2/2001 |
| JP | 2001-030716 | * | 2/2001 |
| JP | 2002-234313 | * | 8/2002 |
| WO | WO 98/03357 | * | 1/1998 |
| WO | WO 01/39994 A |   | 6/2001 |

* cited by examiner

*Primary Examiner*—Steven D. Maki
(74) *Attorney, Agent, or Firm*—Cohen Pontani Lieberman & Pavane LLP

(57) ABSTRACT

A tread of rubber mix provided with a tread pattern formed by a plurality of elements in relief (1) defining grooves or incisions, this tread furthermore comprising at least one inserted element (3) arranged in a groove between two neighboring elements in relief, this inserted element having a contact face (31) intended to be in contact with the roadway and offset towards the inside of the tread relative to the contact faces of the neighboring elements, this inserted element (3) having lateral faces, some of said faces being provided with a plurality of connecting reliefs (6) of rubber mix making the inserted element (3) and at least one neighboring element (1) integral.

10 Claims, 2 Drawing Sheets

COUPE SELON V-V

COUPE SELON VI-VI

TREAD PATTERN HAVING AT LEAST ONE INSERTED ELEMENT

RELATED APPLICATION

This application is a U.S. Continuation Application of International Application PCT/EP2004/006333 filed Jun. 11, 2004.

FIELD OF THE INVENTION

The subject of the present invention is an improvement in treads for tires intended to be fitted on heavy vehicles; it relates in particular to the tread pattern of these treads.

This invention is particularly, but not exclusively, intended to be used for radial-carcass tires intended for the non-driving axles of heavy vehicles.

Such tires as a general rule comprise a carcass reinforcement surmounted radially to the outside by a crown belt which itself is surmounted by a tread provided with a tread pattern formed essentially of ribs of general circumferential orientation defined by grooves of the same orientation or of blocks defined by circumferential grooves and transverse grooves or of a combination of blocks and grooves.

BACKGROUND OF INVENTION

In the case of a tread pattern having grooves of circumferential orientation, it has been noted that for some conditions of use, breaks could appear at the bottom of the groove. This is the case, for example, during a manoeuvre of steering the tire passing over an obstacle or a relief object on the roadway, said relief object being inserted into a groove or alternatively upon mounting obstacles (for example, kerb) with or without steering forces exerted simultaneously on the tire. During this steering manoeuvre, the obstacle or the relief object tend to hinder said steering, and the result is an increase in stresses in the material constituting the tread in particular at the bottom of the grooves.

It is known, in order to avoid attack by various objects which enter the grooves, to arrange protuberances which are continuous or discontinuous in the direction of the groove close to the bottoms of the grooves in order to prevent the spread of said objects towards the inside of the tread (in particular as far as the reinforcement belt of the crown of the tire). During steering manoeuvres, these protuberances, which are of low height (less than 50% of the depth of the groove), are generally insufficient to prevent an obstacle from entering, at least in part, the groove at the exact moment of turning the wheel.

Another solution consists of very substantially increasing the height of these protuberances with the aim of limiting as much as possible, or even preventing, the insertion of an object into the groove during the steering manoeuvre. Document GB 903 389 discloses such a solution. Japanese document 2002/234313 discloses a tread pattern comprising in a groove a rib intended to reduce the wear of a tread, this rib being provided with a plurality of transverse extensions intended to bear against the walls of the ribs of the tread pattern.

These solutions, however, have some drawbacks, which the present invention attempts to overcome. Of these drawbacks, mention may be made of the risk of having cracks appear at the bottom of the grooves, between the reliefs or ribs and the facing walls of said grooves or the risk of having reliefs partially or fully torn away. Furthermore these reliefs or ribs are not completely effective in the case which is of concern here, namely the presence of an object in the groove hindering steering of the tire (that is to say, necessitating a greater steering force).

SUMMARY OF THE INVENTION

The subject of the invention is a tread of rubber mix for tires, this tread being provided with a tread pattern formed by a plurality of elements in relief comprising contact faces for coming into contact with the roadway during travel and lateral faces defining grooves or incisions, all of the faces intended to come into contact with the roadway forming a running surface. This tread furthermore comprises at least one tread pattern element, termed "inserted element", arranged in a groove between two neighboring elements in relief, this inserted element having lateral faces and a contact face, said contact face being offset radially towards the inside of the tread relative to the contact faces of the neighboring elements so as to be able to be in contact with the roadway during travel. The tread is characterized in that this inserted element is joined, on at least two of its lateral faces, to the neighboring elements in relief by a plurality of connecting bridges of rubber mix distributed in the longitudinal direction of the tread, said connecting bridges being spaced over one and the same lateral face by an average distance of between one and six times the average length of these bridges.

"Average length of a bridge" is to be understood to mean the dimension of a bridge taken in a direction parallel to the trace on the running surface of the lateral faces of the inserted element and of the neighboring tread pattern element. The average distance between two bridges corresponds to the length of the space between two connecting bridges in the same direction on one and the same lateral face. Preferably, the distance between two lateral faces connected by the bridges is at most equal to 2.0 mm and even more preferably at most equal to 1.0 mm.

The radially outer surface of the inserted element is radially offset relative to the contact surface of the neighboring tread pattern elements, that is to say that it touches the ground only when a load is applied to the tire provided with this tread (that is to say, when the compression of the neighboring elements is sufficient). The offset is selected such that this outer surface of the inserted element comes into contact with the ground when new even after only brief initial use compared with the total duration of use of the tread before it is withdrawn because of wear.

What has been described in the case of a tread comprising ribs readily applies to the case of a tread comprising a plurality of blocks arranged circumferentially or alternatively transversely; for example, the inserted element may equally well be a single continuous rib or a plurality of blocks arranged in the same direction.

Advantageously, and in order to promote the evacuation of the water when traveling on a water-covered roadway, it is advisable to provide for the connecting bridges not to create closed zones, that is to say zones without the possibility of flow other than via the opening onto the rolling surface. The effect of the latter arrangement is also favorable in terms of the traveling noise.

To produce such a tread pattern, known techniques consisting of molding the incision separating the inserted element from at least one neighboring tread pattern element may be used, using a material in the form of a sheet or film the thickness of which corresponds to the width of the incision (that is to say to the average distance between the opposing faces defining the incision) and having the characteristic of withstanding the molding and vulcanization forces of the tread, this sheet having a plurality of orifices to allow the rubber mix to pass through during said molding in order to form connecting bridges connecting the sacrificed element to at least one neighboring element. This sheet is preferably made from a material capable of being eliminated automatically during travel, for example by the action of humidity on said material.

Furthermore, a person skilled in the art is capable of selecting the connection ratio between an inserted element and the neighboring elements so as to impart both sufficient rigidity of connection between said elements in relief and flexibility suitable for making it possible to bring the inserted element into contact with the roadway during travel.

"Connection ratio" is understood to mean the ratio between the total bridging surface (that is to say, the total of the surfaces of intersection of all the bridges on a lateral face of an element in relief) and the total surface of the lateral face. When this ratio is zero, this means that there is no bridge, and when it is equal to unity, this means that the connecting bridges occupy the entire lateral surface of the connected elements.

Preferably, an inserted element is connected to a neighboring element by a plurality of connecting bridges extending in the direction of the depth of the groove of depth V within which is placed said inserted element, these bridges extending between the inserted element and the neighboring elements over at least 80% of the depth V.

When this inserted element is formed by a succession of blocks, it may be advantageous, in addition to the connections by rubber bridges to the neighboring tread pattern elements, to provide for mechanical connecting bridges of rubber mix to be present between said inserted elements themselves.

In another variant of a tread pattern according to the invention, at least one inserted element is connected to neighboring elements by bridges extending from the contact surface of the inserted element to the bottom of the groove within which the inserted element is provided. This variant may be obtained by conventionally molding the surfaces of the tread pattern elements and by at the same time molding sorts of wells (corresponding to the spaces between the bridges) extending in the thickness of the tread. These wells may or may not be regularly spaced in the circumferential or transverse direction, depending on the inserted element considered.

The wells then form successive parts of one and the same incision and the spaces filled with rubber between these wells form connecting bridges.

Preferably, each well or space, of length D in a direction parallel to the trace on the rolling surface of the lateral faces of an inserted element and its neighboring tread pattern element, has a sectional area of between 0.5 mm$^2$ and 10 mm$^2$.

The wells produced may have any sectional geometry: in particular, circular, elliptical, rectangular, triangular, or semi-circular, semi-elliptical or semi-rectangular. To avoid as far as possible any concentration of stresses at certain points of the wells during use, it is advisable to use a sectional geometry of the wells, the contour of which does not comprise an angular point (thus a circular form is preferred to a rectangular form in particular). Furthermore, provision may be made to widen the bottoms of the wells to avoid concentrations of forces at the bottom of said wells.

The wells thus produced may have, viewed in a meridian section plane, that is to say one containing the axis of rotation of the tire provided with a tread according to the invention, appropriate inclinations relative to a line perpendicular to the rolling surface. The angle of inclination is preferably less than or equal to 25° with a line perpendicular to the rolling surface. More preferably still, the angle is of between 0° and 15°.

Of course, if it is desired to have satisfactory drainage performance when traveling over a water-covered road, it is preferable for the wells formed not to be isolated from each other but to be interconnected to allow the passage of the water. In the event that the inserted element is oriented transversely on the tread, the molding method described in U.S. Pat. No. 6,484,772 or alternatively in U.S. Pat. No. 6,143,223 may be used.

In the event that the orientation of the incision separating an inserted element from another element in relief is circumferential (or alternatively longitudinal), the method consisting of molding the incision with a sheet or a film provided with orifices is suitable. In this latter case, it is also possible to provide for forming a plurality of channels in the tread, each of these channels opening at one of its ends on to at least one lateral surface of said tread and at another end into at least one well separating an element in relief from an inserted element.

BRIEF DESCRIPTION OF THE DRAWINGS

Other characteristics and advantages of the invention will become apparent from the description given hereafter with reference to the appended drawings, which show, by way of non-limitative examples, forms of embodiment of the subject of the invention.

DESCRIPTION OF THE PREFERRED EMBODIMENTS

Figure 1:
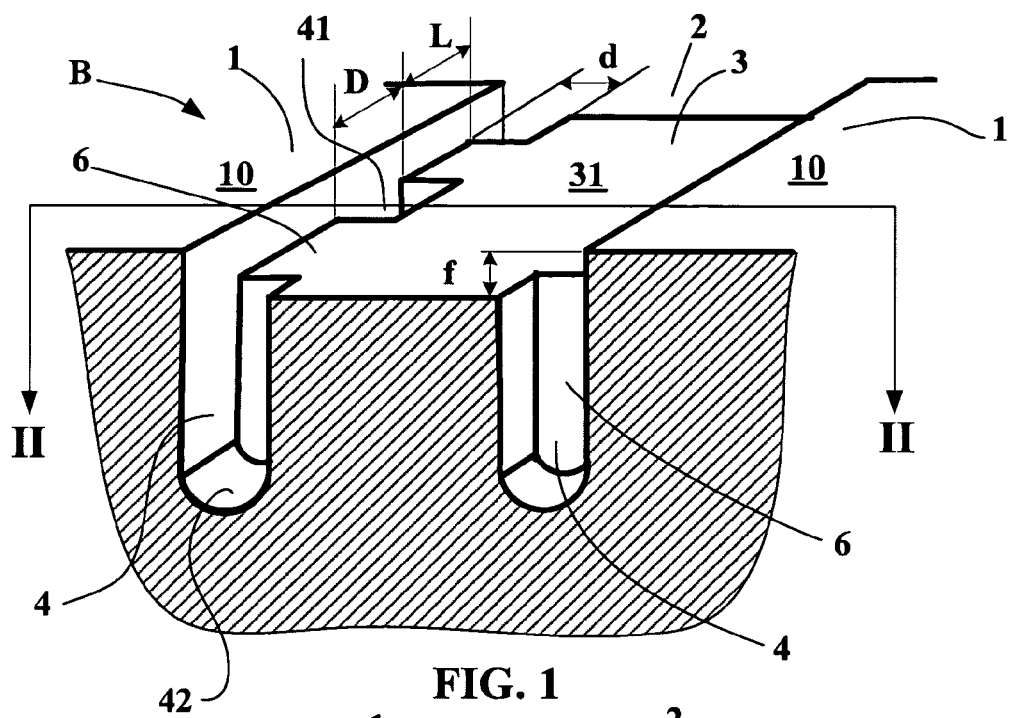
FIG. 1 shows a partial perspective view of a tread for a tire according to the invention.

In FIG. 1, there can be seen a partial perspective view of a tread B according to the invention. In this partial view, there can be seen two ribs 1 defining a groove 2 within which is arranged an inserted rib 3 extending in the same direction as the neighboring ribs 1. This inserted rib 3 defines with each of the neighboring ribs 1 an incision 4 of a width of 0.6 mm.

Furthermore, this inserted rib 3 is connected mechanically to the two neighboring ribs 1 by rubber connecting bridges 6.

Figure 2:
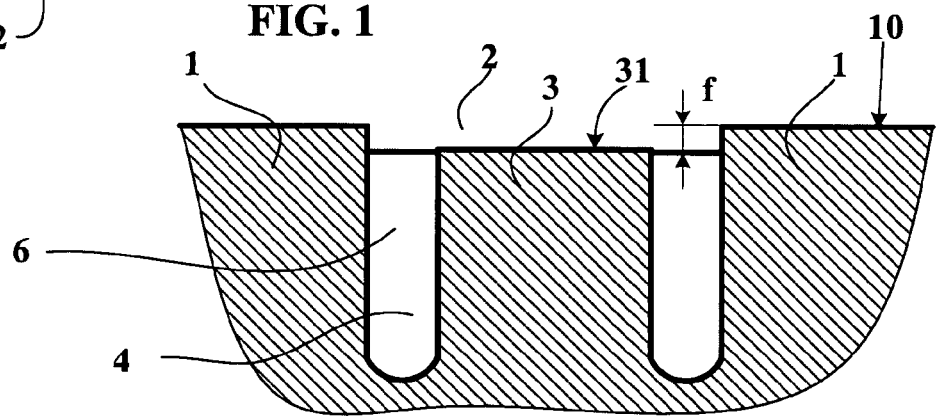
FIG. 2 shows a sectional view along the line II-II in FIG. 1.

These connecting bridges 6 extend over the entire height of the inserted rib 3, running from the contact surface 31 of said element to the bottom 42 of the incisions 4. In the section II-II in FIG. 1 and shown in FIG. 2, there can be seen the inserted rib 3 the contact surface 31 with the ground of which is offset relative to the contact surface 10 of the neighboring ribs 1 with an offset f appropriate for having contact of the contact face 31 of the inserted rib 3 with the roadway upon travel. This contact is produced either from the start of use of the tire provided with this new tread, or after initial use.

In this variant, the bridges 6 have a length L and a width d and are separated from each other by wells 41 the section of which is rectangular of a length D and a width d.

Figure 3:
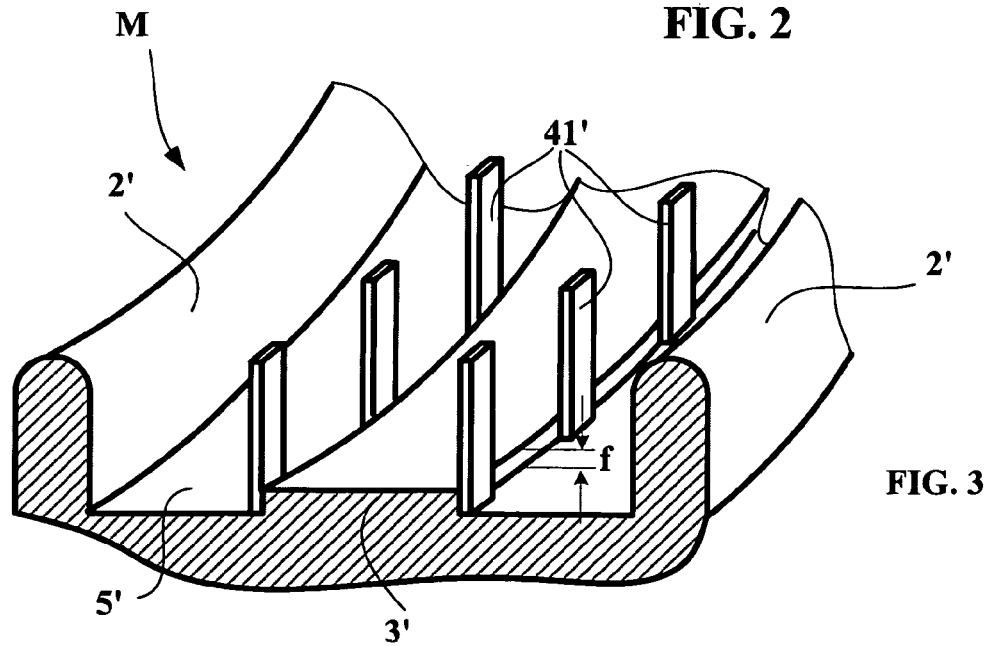
FIG. 3 shows a partial view through a mould for molding the tread pattern shown in FIG. 1.

Such a tread pattern is for example produced with a mould M, only part of which is shown in FIG. 3. In this FIG. 3, there can be seen on a surface 5' of the mould M ribs 2' for molding grooves defining main ribs.

Between these ribs 2' on the mould there is arranged an intermediate rib 3' forming a relief on the surface of the mould with an offset f, this intermediate rib 3' having a height less than the height of the neighboring ribs 2', said heights being measured relative to the surface of the mould. Furthermore, along each lateral face of the intermediate rib 3' are arranged, regularly distributed, a plurality of rods 4' of rectangular section.

The example described uses rods 41' of rectangular section, but is not of course limited to this geometry and in particular other sectional forms may be used, such as circular, elliptical or triangular forms. To avoid the risk of formation of cracks at the bottom of the wells, it is preferable to provide the innermost part of each rod 41' with a widened part.

Figure 4:
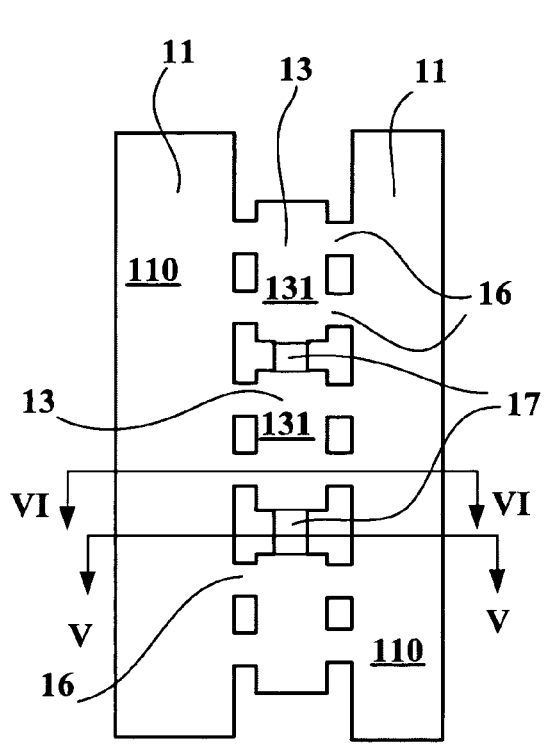
FIGS. 4, 5 and 6 show, in plan and in section, one and the same variant of a tread according to the invention, the inserted elements of which are interconnected blocks.
Figure 5:
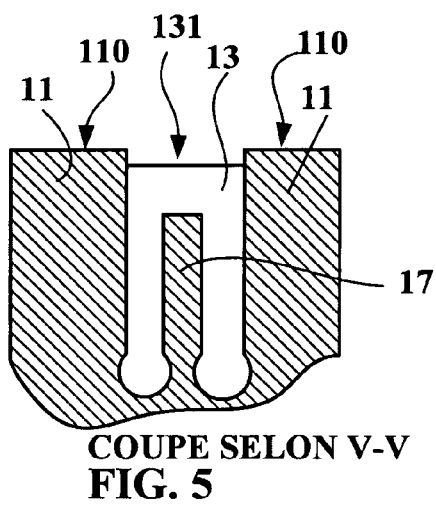
Figure 6:
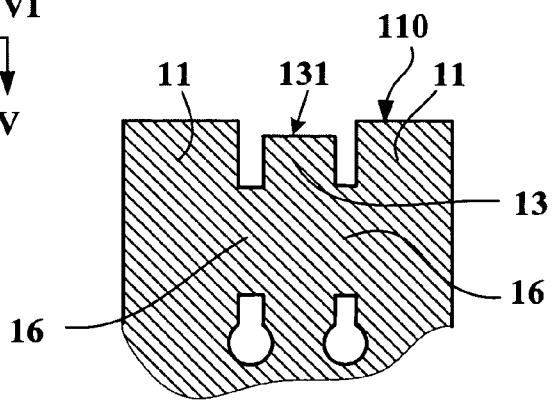

In another variant, the connecting bridges may be formed only from a height equivalent to a certain percentage of the depth of the incision beneath the contact surface of the inserted tread pattern element, as is the case with the variant shown in FIGS. 4 to 6.

In FIG. 4, there can be seen a plan view of the rolling surface of a tread according to the invention comprising at least two ribs 11 and between these ribs a series of inserted blocks 13, each of said blocks 13 having an outer surface 131 which is slightly offset beneath the contact surface 110 of the ribs 11 surrounding said blocks 13.

Each of these blocks 13 is connected on its two lateral faces to the two ribs 11 by connecting bridges 16, of which it can be seen in FIG. 6 (section along the line VI-VI) that they are themselves offset radially towards the inside relative to the contact surface 131 of the inserted elements 13. These bridges 16 extend in the direction of the depth only over part of the depth of the incision separating the inserted blocks from the neighboring tread pattern elements so as to maintain satisfactory water drainage performance when traveling on a wet road.

Furthermore, these inserted blocks 13 are interconnected by connecting bridges 17 which are visible on the section along the line V-V shown in FIG. 5. Of course, this is only a variant, and the connecting bridges 17 between the blocks may be omitted.

Preferably, only the grooves most susceptible to breaks at the bottom of the groove are provided with inserted elements in relief and the other grooves are left without inserted element to permit sufficient drainage and thus maintain necessary performance in particular on a wet road.

Figure 7:
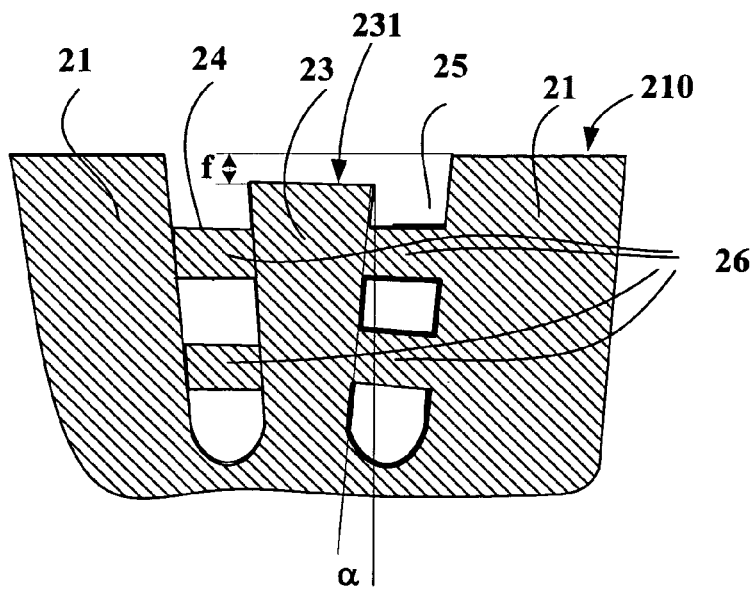
FIG. 7 shows a variant in which an inserted element together with a neighboring element defines an inclined incision.

In another variant shown in FIG. 7, an inserted element in relief is connected by a plurality of rubber bridges to two ribs. In this variant, an inserted element 23 is arranged between two neighboring elements 21 and has a contact surface 231 which is offset by a quantity f relative to the outer surface 210 of the neighboring elements 21. This inserted element 23 defines with each neighboring element an incision 25 inclined by an average angle $\square$ with a line perpendicular to the contact surface 231 of the inserted element.

At present, the angle $\square$ is 10° and such that the width of the inserted element viewed from the running surface of the tread decreases as said tread becomes worn.

The inserted element 23 is connected to each neighboring element 21 by connecting bridges 26 offset in the direction of the depth of the inclined incision 25.

Preferably, the average angle $\square$ of inclination of the incisions between an inserted element and a neighboring element with a line perpendicular to the contact surface of the inserted element is at most equal to 25°.

The invention is not limited to the examples described and shown, and various modifications can be made thereto without departing from the scope thereof. In particular, the angle of inclination of the incisions may be selected such that the width of the inserted element increases with wear. It is also possible to combine the presence of an inclined incision of an angle greater than zero and another incision forming a zero angle with a line perpendicular to the rolling surface.

Of course, this invention may be combined with the presence axially to the outside of the edge ribs of what is called a "sacrificed" rib with respect to wear in order to protect this edge rib from irregular wear on its sharp edges. This sacrificed rib has an external contact surface intended to come into contact with the roadway during travel, the difference in the rolling radii of this sacrificed rib and of the edge rib resulting in amplifying the slip on the sacrificed rib, thus bringing about pronounced wear on this rib. This rib which is offset in the direction of the thickness is separated from the edge rib by a narrow incision the facing walls of which are connected by a plurality of connecting bridges of rubber mix.

In the event that the bridges are formed in grooves of general circumferential (longitudinal) orientation and define closed spaces (with the exception of the opening onto the rolling surface), it may be advantageous to provide the tread with a plurality of channels opening on one hand on to the outside of the tread and on the other hand into the spaces.

In order to maintain a substantially constant length of sharp rubber edges in the contact surface of the tread with the roadway, it is advantageous to arrange the connecting bridges offset in the direction of the inserted element.

What is claimed is:

1. A tread of rubber mix for a tire, the tread comprising:
a tread pattern formed by
a plurality of elements in relief, each element in relief comprising a first contact surface for contacting a road during travel, and two lateral faces, and
an inserted element arranged in a groove formed by two neighboring elements in relief and comprising two lateral faces facing the respective lateral faces of the neighboring elements in relief, and a second contact face,
wherein said second contact face is offset radially towards the inside of the tread relative to the first contact faces of the neighboring elements in relief so as to be able to be in contact with the roadway during travel,
wherein the inserted element is connected to the neighboring elements in relief by a plurality of connecting bridges of rubber mix which have an average length L,
wherein the connecting bridges between the inserted element and each neighboring element in relief define a plurality of wells having an average length D, the average length L of the connecting bridges being between one and six times the average length D, the length D and the average length L being measured in a direction parallel to a trace on the rolling surface of the lateral faces of the inserted element, and
wherein each connecting bridge comprises only one outer surface which connects to and constitutes a continuation of the second contact surface of the inserted element.

2. The tread according to claim 1, wherein the wells have a depth V, the connecting bridges extending in the direction of the depth over at least 80% of the depth V.

3. The tread according to claim 1, wherein the wells have an average cross section of between 0.5 and 10 mm$^2$.

4. The tread according to claim 3, wherein each well is inclined relative to a line perpendicular to the second contact surface by an angle less than or equal to 25°.

5. The tread according to claim 4, wherein the angle of inclination of the wells is such that the second contact surface of the inserted element changes with wear.

6. The tread according to claim 5, wherein the second contact surface of the inserted element decreases with wear.

7. The tread according to claim 1, wherein the trace on the second contact surface of the inserted element is of general longitudinal orientation.

8. The tread according to claim 7, wherein the inserted element is a continuous rib.

9. The treat according to claim 1, wherein each connecting bridge has a height extending from a bottom of the groove to the second contact surface.

10. A tread of rubber mix for a tire, the tread comprising:
   a tread pattern formed by
      a plurality of elements in relief, each element in relief comprising a first contact surface for contacting a road during travel, and two lateral faces, and
   an inserted element arranged in a groove formed by two neighboring elements in relief and comprising two lateral faces facing the respective lateral faces of the neighboring elements in relief, and a second contact face,
   wherein said second contact face is offset radially towards the inside of the tread relative to the first contact faces of the neighboring elements in relief so as to be able to be in contact with the roadway during travel,
   wherein the inserted element is connected to the neighboring elements in relief by a plurality of connecting bridges of rubber mix which have an average length L,
   wherein the connecting bridges between the inserted element and each neighboring element in relief define a plurality of wells having an average length D, the average length L of the connecting bridges being between one and six times the average length D, the length D and the average length L being measured in a direction parallel to a trace on the rolling surface of the lateral faces of the inserted element,
   wherein the wells have an average cross section of between 0.5 and 10 mm$^2$,
   wherein each well is inclined relative to a line perpendicular to the second contact surface by an angle less than or equal to 25°, and
   wherein the second contact surface of the inserted element decreases with wear.

* * * * *